UNITED STATES PATENT OFFICE.

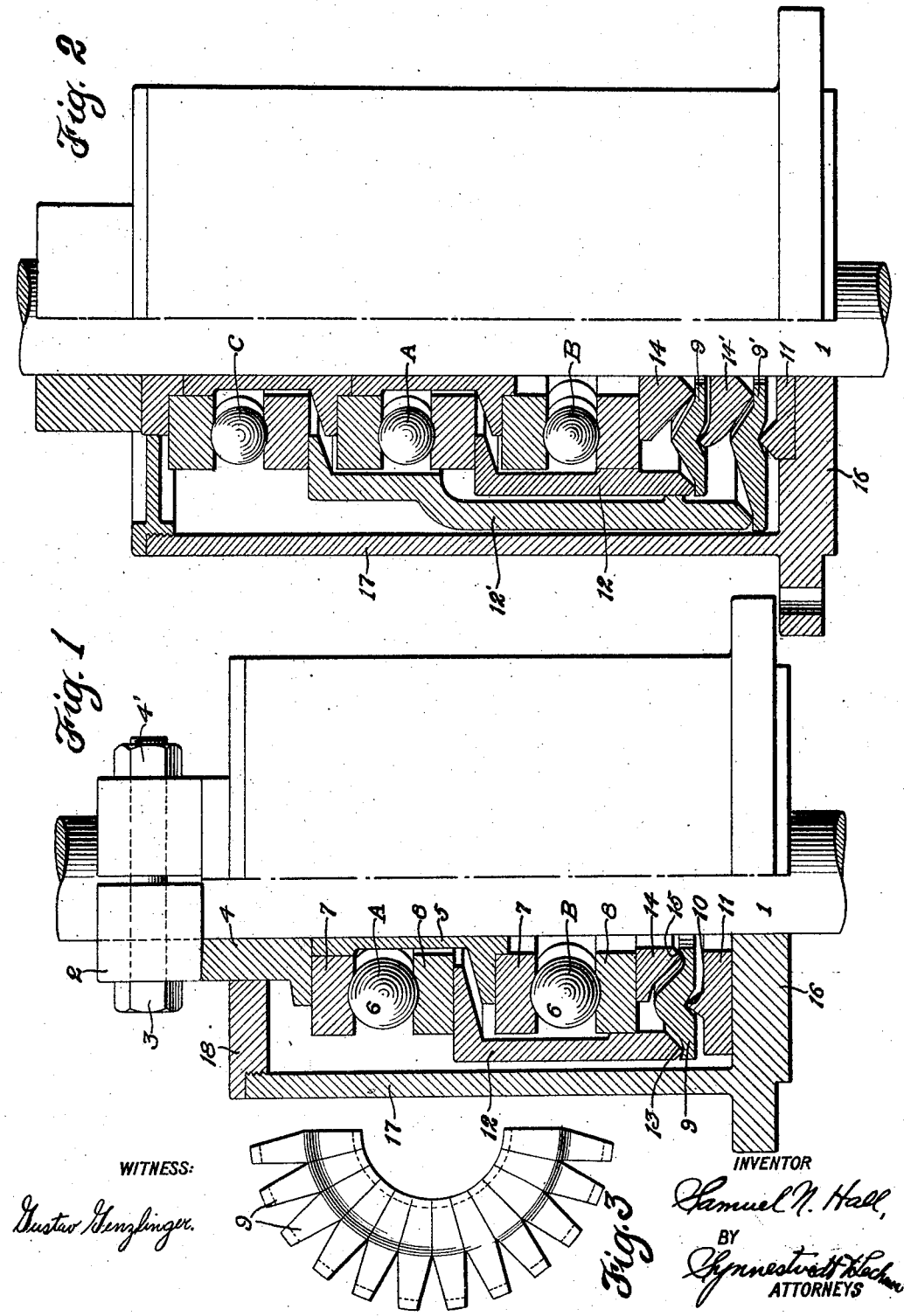

SAMUEL N. HALL, OF LOS ANGELES, CALIFORNIA.

THRUST BEARING.

1,421,082.  Specification of Letters Patent.  Patented June 27, 1922.

Application filed August 16, 1920. Serial No. 403,919.

*To all whom it may concern:*

Be it known that I, SAMUEL N. HALL, a citizen of the United States, residing at Los Angeles, in the county of Los Angeles and State of California, have invented certain new and useful Improvements in Thrust Bearings, of which the following is a specification.

This invention relates to devices for carrying the thrust load of a revolving shaft, and has for its principal objects the provision of a plurality of bearings for carrying such load and of means for equalizing the load among them. It is especially useful for supporting the load of the revolving shaft in a rotary deep well pump, and as so used, I have illustrated it in the accompanying drawings, wherein:

Figure 1 is a side view of my improvement, one half being in section, and the other half in elevation; Figure 2 is a view similar to that of Fig. 1, but illustrating a modification; Figure 3 is a partial plan view of a detail of the invention.

The thrust of the revolving shaft 1 is transmitted to the bearings A and B through the medium of the ring 2, clamped around the shaft by means of the bolt 3 and nut 4', and the thrust collars or sleeves 4 and 5. The thrust collar 4 is secured against movement in a direction counter to the shaft thrust by virtue of its contact with the damp-ring 2, and the thrust sleeve 5 lies against the collar 4 within the bearing A.

Bearings A and B are each composed of a plurality of balls 6 lying between relatively rotating members in the form of upper plates or rings 7 and lower rings 8. Sleeve 4 rests upon plate 7 of bearing A and also upon the upper end of sleeve 5 which rests upon the upper plate 7 of bearing B. The upper plate 7 of bearing A is definitely centered about the shaft by internal engagement with the upper end of the thrust sleeve 5, and the upper plate 7 of bearing B is likewise centered by sleeve 5, by internal engagement with its reduced lower end.

Below these two bearings A and B I dispose a ring composed of a plurality of yoke shaped balance-beam segments 9 which are supported on their under side upon the circular fulcrum 10 of a base plate or ring 11. The load of bearing A is transmitted through the sleeve or bushing 12, which surrounds and extends down past the bearing B, in axially sliding internal engagement with its lower member 8 to the outer ends of the pivoted segments 9, there being a fulcrum connection 13 between the lower end of the bushing 12 and the upper surface of the segments 9.

The load of bearing B is transmitted through the ring 14 to the inner ends of the segments 9, there being a fulcrum connection 15 between this ring 14 and the inner ends of the segments. It will thus be seen that any inequality in the proportion of the load that each bearing is carrying will be readily compensated for and evenly distributed through the medium of this segmental ring. If bearing A is carrying a greater proportion of the load than bearing B, it will force down the outer ends of the segments 9, and at the same time the inner ends will rise until an equilibrium is reached between the two sets of bearings.

It will be noted that the segments 9 are so constructed as to bring the three fulcrum points 10, 13 and 15 in an approximately horizontal line which construction reduces the friction, as the segments rock, to the minimum.

The lower most ring 11 rests upon the bottom or floor 16 of the cup shaped housing 17 which is adapted to be filled with lubricant and to be closed at the top by the threaded cap 18.

The construction of Figure 2 is approximately the same as that of Figure 1 except that three bearings are illustrated instead of two. The load between bearings A and B is equalized in exactly the same manner as it was equalized in the same bearings in Figure 1. For bearing C, however, there is provided an additional sleeve or bushing 12' which rests upon the outer ends of the segments 9' of a second segmental ring. The combined load of bearings A and B is transmitted to the inner ends of the segments 9' through the medium of the ring 14'. It will be seen that the construction is practically the same except that the load is illustrated as being distributed between three bearings instead of two. Similar apparatus could be used were it found necessary or desirable to use more than three bearings.

I claim:

1. In a thrust device for a revolving shaft comprising a support and a pair of bearings between the shaft and the support, the combination with means for transmitting the load from the bearings of means for equalizing it between them comprising a ring composed of a plurality of independent balance-beam segments receiving load from said transmitting means at points substantially in the horizontal plane of their fulcrum.

2. In a thrust device for a revolving shaft comprising a support and means for transmitting the thrust load from a plurality of bearings to the support and equalizing the load between the bearings, the combination with the shaft of a thrust collar thereon secured against movement in a direction counter to the shaft thrust, a bearing around the shaft against said collar, a thrust sleeve around the shaft against said collar within the aforesaid bearing, and another bearing around the shaft against said sleeve.

3. A thrust device interposed between a revolving shaft and a support therefor comprising a thrust collar on the shaft secured against movement in a direction counter to the shaft thrust, a bearing around the shaft against said collar, a thrust sleeve around the shaft against said collar within the aforesaid bearing, another bearing around the shaft against said sleeve, and means for transmitting the thrust load from said bearings to the support and equalizing the load between the bearings, including a sleeve receiving the load from the first-mentioned bearing and in axially sliding internal engagement with one of the relatively rotating members of the second-mentioned bearing.

4. A thrust device interposed between a revolving shaft and a support therefor comprising a thrust collar on the shaft secured against movement in a direction counter to the shaft thrust, a bearing around the shaft against said collar, with one of its relatively rotating members definitely centered about the shaft, a thrust sleeve around the shaft against said collar within the aforesaid bearing, another bearing around the shaft with one of its relatively rotating members lying against said thrust sleeve and centered about the shaft thereby, and means for transmitting the thrust load from said bearings to the support and equalizing the load between the bearings, including a sleeve receiving the load from the first mentioned bearing and in axially sliding internal engagement with the other relatively rotating member of the second-mentioned bearing.

In testimony whereof, I have hereunto signed my name.

SAMUEL N. HALL.